(12) United States Patent
Ideno (10) Patent No.: US 11,106,229 B2
(45) Date of Patent: Aug. 31, 2021

(54) SEMICONDUCTOR INTEGRATED CIRCUIT INCLUDING A REGULATOR CIRCUIT

(71) Applicant: Toshiba Memory Corporation, Tokyo (JP)

(72) Inventor: Hiroyuki Ideno, Yokohama Kanagawa (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 168 days.

(21) Appl. No.: 16/283,325

(22) Filed: Feb. 22, 2019

(65) Prior Publication Data
US 2020/0081466 A1  Mar. 12, 2020

(30) Foreign Application Priority Data

Sep. 10, 2018  (JP) .............................. JP2018-168621

(51) Int. Cl.
| | | |
|---|---|---|
| G05F 1/575 | (2006.01) | |
| G05F 1/569 | (2006.01) | |
| H02H 1/00 | (2006.01) | |
| H02H 9/02 | (2006.01) | |

(52) U.S. Cl.
CPC .............. G05F 1/569 (2013.01); G05F 1/575 (2013.01); H02H 1/0007 (2013.01); H02H 9/025 (2013.01)

(58) Field of Classification Search
CPC . G05F 1/467; G05F 1/56; G05F 1/565; G05F 1/575; G05F 1/10; G05F 3/18; G05F 3/30; G05F 3/245; G05F 3/262; G05F 3/265; G05F 3/205; H02H 9/071; G11C 5/147; H01L 23/5228; H01L 23/5223; H01L 2924/0002
See application file for complete search history.

(56) References Cited

U.S. PATENT DOCUMENTS

| | | | | | |
|---|---|---|---|---|---|
| 5,387,880 | A | * | 2/1995 | Kobayashi | .............. H03F 1/226 |
| | | | | | 330/277 |
| 5,828,329 | A | * | 10/1998 | Burns | ...................... G05F 3/225 |
| | | | | | 341/155 |
| 5,886,570 | A | * | 3/1999 | Brokaw | .................. G05F 1/575 |
| | | | | | 327/483 |

(Continued)

FOREIGN PATENT DOCUMENTS

JP   2003-067062 A   3/2003

*Primary Examiner* — Thienvu V Tran
*Assistant Examiner* — Nusrat Quddus
(74) *Attorney, Agent, or Firm* — Foley & Lardner LLP (57) ABSTRACT

A semiconductor integrated circuit includes an output transistor, an error amplifier, a replica transistor, a current-limiting circuit, and a potential regulation circuit. The output transistor is electrically connected between a power supply-side first node and an output-side second node. The replica transistor is electrically connected between the first node and a fourth node. The replica transistor constitutes a circuit that is configured to operate to correspond to the output transistor. The current-limiting circuit has an input node, that is electrically connected to a fifth node between the fourth node and a first current source, and an output node that is electrically connected to a gate of the output transistor and a gate of the replica transistor. The potential regulation circuit is electrically connected to the second node and the fourth node.

17 Claims, 4 Drawing Sheets

(56) References Cited

U.S. PATENT DOCUMENTS

| | | | |
|---|---|---|---|
| 6,204,724 B1* | 3/2001 | Kobatake | G05F 3/262 327/541 |
| 6,433,624 B1* | 8/2002 | Grossnickle | G05F 3/262 327/543 |
| 6,509,722 B2* | 1/2003 | Lopata | H03F 3/45183 323/275 |
| 6,952,091 B2* | 10/2005 | Bansal | G05F 1/575 323/277 |
| 7,166,991 B2* | 1/2007 | Eberlein | G05F 1/575 323/280 |
| 7,315,154 B2 | 1/2008 | Sugiura | |
| 7,675,273 B2* | 3/2010 | Ko | G05F 1/575 323/269 |
| 7,839,218 B2* | 11/2010 | Shimamoto | H03F 3/24 330/298 |
| 8,098,057 B2* | 1/2012 | Morino | G05F 1/56 323/269 |
| 8,289,009 B1* | 10/2012 | Strik | G05F 1/575 323/272 |
| 8,716,993 B2* | 5/2014 | Kadanka | G05F 1/565 323/274 |
| 9,588,541 B1* | 3/2017 | Ho | G05F 1/573 |
| 9,740,223 B1* | 8/2017 | Wang | G05F 1/575 |
| 10,008,931 B2* | 6/2018 | Ideno | G05F 1/563 |
| 10,416,695 B1* | 9/2019 | Bohannon | G05F 1/575 |
| 10,644,591 B1* | 5/2020 | Zhang | H02M 1/14 |
| 2002/0158679 A1 | 10/2002 | Matsuo | |
| 2007/0146020 A1* | 6/2007 | Williams | H03K 17/08122 327/110 |
| 2008/0316663 A1* | 12/2008 | Martin | H01L 27/0285 361/56 |
| 2010/0144402 A1* | 6/2010 | Watanabe | G06K 19/0723 455/572 |
| 2012/0262137 A1* | 10/2012 | Arigliano | G05F 1/573 323/277 |
| 2013/0069613 A1* | 3/2013 | Nakase | H02M 3/156 323/284 |
| 2013/0099764 A1* | 4/2013 | Zhang | G05F 1/575 323/273 |
| 2013/0200866 A1* | 8/2013 | Kushibe | G05F 1/565 323/275 |
| 2014/0084878 A1* | 3/2014 | Tomioka | H03K 17/005 323/225 |
| 2014/0184182 A1* | 7/2014 | Yajima | G05F 1/575 323/273 |
| 2014/0266104 A1* | 9/2014 | El-Nozahi | G05F 1/575 323/280 |
| 2014/0266118 A1* | 9/2014 | Chern | H02M 3/156 323/283 |
| 2014/0269136 A1* | 9/2014 | Kamiya | G11C 5/14 365/226 |
| 2015/0229304 A1* | 8/2015 | Suzuki | G05F 1/565 327/143 |
| 2016/0147239 A1* | 5/2016 | Yan | G05F 1/56 323/280 |
| 2016/0239029 A1* | 8/2016 | Ideno | H02H 9/04 |
| 2016/0266599 A1* | 9/2016 | Ideno | G05F 3/267 |
| 2017/0115679 A1* | 4/2017 | Watanabe | G05F 1/575 |

* cited by examiner

SEMICONDUCTOR INTEGRATED CIRCUIT INCLUDING A REGULATOR CIRCUIT

This application is based upon and claims the benefit of priority from Japanese Patent Application No. 2018-168621, filed Sep. 10, 2018, the entire contents of which are incorporated herein by reference.

FIELD

Embodiments described herein relate generally to a semiconductor integrated circuit.

BACKGROUND

In a semiconductor integrated circuit that includes a regulator circuit provided between an input terminal and an output terminal, an output transistor in the regulator circuit is turned on to make the input terminal and the output terminal conductive to each other. At this time, it is desired to appropriately control a current flowing toward the output terminal via the output transistor.

DETAILED DESCRIPTION

At least one embodiment provides a semiconductor integrated circuit that can appropriately control a current flowing toward an output terminal via an output transistor.

In general, according to at least one embodiment, a semiconductor integrated circuit including: an output transistor; an error amplifier; a replica transistor; a current-limiting circuit; and a potential regulation circuit is provided. The output transistor is electrically connected between a power supply-side first node and an output-side second node. The error amplifier has a first input terminal that is electrically connected to a third node between the second node and a standard potential, a second input terminal that is electrically connected to a reference voltage, and an output terminal that is electrically connected to a gate of the output transistor. The replica transistor is electrically connected between the first node and a fourth node. The replica transistor constitutes a circuit that operates to correspond to the output transistor. The current-limiting circuit has an input node that is electrically connected to a fifth node between the fourth node and a first current source and an output node that is electrically connected to the gate of the output transistor and a gate of the replica transistor. The potential regulation circuit is electrically connected to the second node and the fourth node.

A semiconductor integrated circuit according to at least one embodiment will be described hereinafter in detail with reference to the accompanying drawings. It is noted that this embodiment does not limit the present disclosure.

Embodiment

Figure 1:
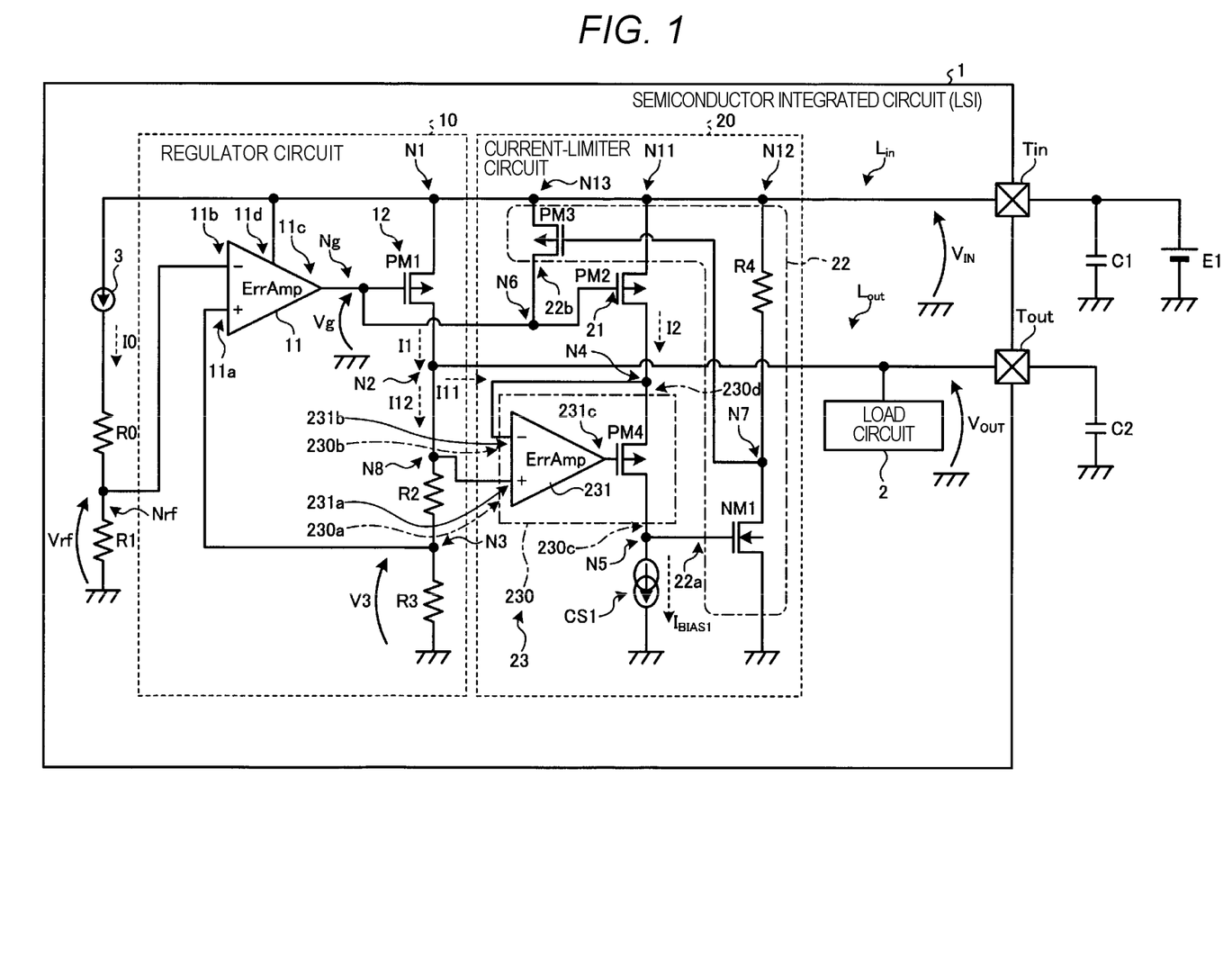
FIG. 1 is a circuit diagram showing a configuration of a semiconductor integrated circuit according to a modification of at least one embodiment.

A configuration of the semiconductor integrated circuit according to at least one embodiment will first be described with reference to FIG. 1. FIG. 1 is a circuit diagram showing a configuration of the semiconductor integrated circuit according to the embodiment.

A semiconductor integrated circuit 1 has a regulator circuit 10 mounted thereon. The regulator circuit 10 is provided between an input terminal Tin and an output terminal Tout of the semiconductor integrated circuit 1. In the semiconductor integrated circuit 1, the input terminal Tin is connected to the regulator circuit 10 via an input line Lin. A capacitive element C1 is connected to the input terminal Tin from outside to stabilize a voltage VIN of the input line Lin. The voltage VIN of the input line Lin may be rephrased as the voltage VIN of the input terminal Tin. A power supply E1 is connected to the input terminal Tin.

In the semiconductor integrated circuit 1, the output terminal Tout is connected to the regulator circuit 10 via an output line Lout. A capacitive element C2 is connected to the output terminal Tout from outside to stabilize a voltage VOUT of the output line Lout. The voltage VOUT of the output line Lout may be rephrased as the voltage VOUT of the output terminal Tout. A load circuit 2 is connected to the output line Lout. The load circuit 2 is, for example, a logic circuit.

In a state of connecting the power supply E1 to the input terminal Tin, the regulator circuit 10 generates an internal power supply voltage (voltage VOUT) from the voltage VIN of the input line Lin, and supplies the generated internal power supply voltage to the load circuit 2.

The semiconductor integrated circuit 1 has the regulator circuit 10 as well as a constant-current source 3 and resistance elements R0 and R1 as peripheral circuit elements of the regulator circuit 10. The regulator circuit 10 has an output transistor 12, an error amplifier 11, and resistance elements R2 and R3.

The output transistor 12 is connected between nodes N1 and N2. The node N1 is the input terminal Tin-side node and connected to the input terminal Tin via the input line Lin. The node N2 is the output terminal Tout-side node and connected to the output terminal Tout via the output line Lout. The output transistor 12 makes the nodes N1 and N2 conductive to each other.

The output transistor 12 has a PMOS transistor PM1. The PMOS transistor PM1 has a source that is connected to the node N1, a drain that is connected to the node N2, and a gate that is connected to a node Ng. The node Ng is the error amplifier 11-side node and connected to an output terminal 11c of the error amplifier 11.

The error amplifier 11 has a non-inverting input terminal 11a, an inverting input terminal 11b, the output terminal 11c, and a bias terminal 11d. The non-inverting input terminal 11a is connected to a node N3. The node N3 is the node between the node N2 and a standard potential (for example, ground potential). The node N3 is connected to the node N2 via the resistance element R2 and connected to the standard potential via the resistance element R3. A voltage V3 of the node N3 is generated by dividing the internal power supply voltage (voltage VOUT) by the resistance elements R2 and R3.

The inverting input terminal 11b is connected to a reference node Nrf. The reference node Nrf is the node between the input line Lin and the standard potential (for example, ground potential). The reference node Nrf is connected to the input line Lin via the resistance element R0 and the constant-current source 3 and connected to the standard potential via the resistance element R1. The constant-current source 3 causes a current I0 to flow through the resistance elements R0 and R1. At this time, a reference voltage Vrf of the reference node Nrf is generated by the resistance element R1 and the current I0.

The output terminal 11c is connected to the node Ng. The node Ng is connected to the gate of the PMOS transistor PM1. The bias terminal 11d is connected to the input terminal Tin via the node N1 and the input line Lin.

The error amplifier 11 controls a voltage Vg of the node Ng so that a difference between the voltage V3 of the node N3 and the reference voltage Vrf is made substantially zero. In other words, the error amplifier 11 feedback-controls a gate voltage of the PMOS transistor PM1 so that the voltage V3 of the node N3 nears the reference voltage Vrf.

In an operating state of the regulator circuit 10, the output transistor 12 is maintained as turned on, a drain current flows through the output transistor 12, and the capacitive element C2 is charged with electric charge, thereby making it possible to keep the voltage VOUT of the output line Lout to a desired value.

At this time, if an overcurrent flows through the output transistor 12, the output transistor 12 is broken down to possibly prohibit the regulator circuit 10 from operating appropriately. To prevent the overcurrent from flowing through the output transistor 12, the semiconductor integrated circuit 1 further has a current-limiter circuit 20.

The current-limiter circuit 20 monitors an electric signal corresponding to a current I1 flowing from the output transistor 12 toward the node N2, and controls the voltage Vg that is a gate voltage of the output transistor 12 to limit the current I1 if the current I1 reaches a threshold current; thus the current-limiter circuit 20 performs a current-limiting operation. The current-limiter circuit 20 has a replica transistor 21 and a current-limiting circuit 22.

The replica transistor 21 is electrically connected between nodes N11 and N4. The node N11 is connected to nodes N1, N13, and N12 and connected to the input terminal Tin via the input line Lin. The node N4 is the node between the node N11 and a current source CS1. The current source CS1 is configured to cause a bias current $I_{BIAS1}$ to flow.

The replica transistor 21 has a PMOS transistor PM2. The PMOS transistor PM2 has a source that is connected to the node N11, a drain that is connected to the node N4, and a gate that is connected to a node N6. The node N6 is connected to the output terminal 11c of the error amplifier 11 via the node Ng. The replica transistor 21 thereby constitutes a circuit that operates to correspond to the output transistor 12.

The current-limiting circuit 22 has an input node 22a and an output node 22b. The input node 22a is electrically connected to a node N5. The node N5 is the node between the node N4 and the current source CS1. The output node 22b is electrically connected to the node N6. The node N6 is electrically connected to the gate of the output transistor 12 and the gate of the replica transistor 21 and connected to the output terminal 11c of the error amplifier 11 via the node Ng.

The current-limiting circuit 22 has an NMOS transistor NM1, a resistance element R4, and a PMOS transistor PM3. The NMOS transistor NM1 has a source that is connected to the ground potential, a drain that is connected to a node N7, and a gate that is connected to the node N5 via the input node 22a. The resistance element R4 has one end that is connected to the node N12 and the other end that is connected to the node N7. The node N12 is connected to the nodes N1, N13, and N11 and connected to the input terminal Tin via the input line Lin. The PMOS transistor PM3 has a source that is connected to the node N13, a drain that is connected to the node N6, and a gate that is connected to the node N7 via the output node 22b. The node N13 is connected to the nodes N1, N11, and N12 and connected to the input terminal Tin via the input line Lin.

In the current-limiter circuit 20, the replica transistor 21 constitutes the circuit that operates to correspond to the output transistor 12 and causes a replica current I2 to flow toward the node N4 in response to the current I1 flowing toward the node N2 by the output transistor 12.

At this time, it is assumed that a dimension of the PMOS transistor PM1 in the output transistor 12 (=W/L, where w: a channel width and L: a channel length) is $D_1$ and that a dimension of the PMOS transistor PM2 in the replica transistor 21 is $D_2$. The replica transistor 21 is designed to satisfy the following Expression (1).

$$D_1 >> D_2 \quad (1)$$

The current I1 of the output transistor 12 and the replica current I2 of the replica transistor 21 satisfy the following Expression (2) in accordance with a relationship of Expression (1).

$$I_1 >> I_2 \quad (2)$$

In other words, a current ratio $MR_1$ of the replica current I2 of the replica transistor 21 to the current I1 of the output transistor 12 is a value $MR_1$ represented by the following Expression (3).

$$MR_1 = I_2/I_1 \approx D_2/D_1 (<<1) \quad (3)$$

The current-limiting circuit 22 operates by causing the replica current I2 from the replica transistor 21 to be higher than the current $I_{BIAS1}$ of the current source CS1 (I2>$I_{BIAS1}$). At I2>$I_{BIAS1}$, a potential of the node N5 rises up to approximately VIN and the NMOS transistor NM1 is turned on. Turning on the NMOS transistor NM1 and lowering the potential of the node N7 down to approximately GND causes the PMOS transistor PM3 to be turned on to raise a potential of the node Ng via the node N6. The current-limiting circuit 22 operates such that the potential of the node Ng rises and the output transistor 12 (PMOS transistor PM1) is turned off, thereby limiting the current I1.

Now, if the output transistor 12 (PMOS transistor PM1) is compared with the replica transistor 21 (PMOS transistor PM2), source potentials thereof are generally equal to a potential in response to the power supply E1. On the other hand, because of a difference between the element (resistance elements R2 and R3) disposed between the drain of the output transistor 12 and the ground potential and the elements (a PMOS transistor PM4 to be described later and the current source CS1) disposed between the drain of the replica transistor 21 and the ground potential, a drain potential of the output transistor 12 possibly differs from that of the replica transistor 21.

For example, if the drain potential of the replica transistor 21 is lower than that of the output transistor 12, then a drain-source voltage Vds of the replica transistor 21 is higher than a drain-source voltage Vds of the output transistor 12, and the current ratio MR becomes a value $MR_2$ (>$MR_1$) higher than a design value of Expression (3). If the current ratio MR is the value $MR_2$ higher than the design value of Expression (3), the current-limiting operation performed by the current-limiting circuit 22 is more effective; thus, there is a probability that a current necessary for the output transistor 12 cannot be supplied thereto.

On the other hand, if, for example, the drain potential of the replica transistor 21 is higher than that of the output transistor 12, then the Vds of the replica transistor 21 becomes lower than that of the output transistor 12, and the mirror ratio MR becomes a value $MR_3$ ($<MR_1$) lower than the design value of Expression (3). If the mirror ratio MR is the $MR_3$ lower than the design value of Expression (3), the current-limiting operation performed by the current-limiting circuit 22 is less effective; thus, there is a probability that the overcurrent passes through the output transistor 12 to break down the output transistor 12.

If the Vds difference between the output transistor 12 and the replica transistor 21 greatly varies in the regulator circuit 10 where an operating range of the input voltage VIN is wide and an input-output potential difference (value of VIN-VOUT) is small, then a variation in a limited-current value increases and it is difficult for the current-limiting circuit 22 to perform an appropriate current-limiting operation.

In at least one embodiment, therefore, making the drain potential of the output transistor 12 equal to that of the replica transistor 21 in the semiconductor integrated circuit 1 makes it possible for the current-limiting circuit 22 to perform an appropriate current-limiting operation.

Specifically, the current-limiter circuit 20 has a potential regulation circuit 23. The potential regulation circuit 23 is electrically connected to the node N2 via the node N8 and electrically connected to the node N4. The potential regulation circuit 23 makes the nodes N2 and N4 equal in potential. It is thereby possible to make the drain potential of the output transistor 12 equal to that of the replica transistors 21.

The potential regulation circuit 23 has a voltage follower 230. The voltage follower 230 has a non-inverting input terminal 230a, an inverting input terminal 230b, an output terminal 230c, and an output terminal 230d. The non-inverting input terminal 230a of the voltage follower 230 is electrically connected to the node N2 via the node N8. The output terminal 230c is electrically connected to the node N5. The output terminal 230d is electrically connected to the inverting input terminal 230b and electrically connected to the node N4. A potential of the output terminal 230c has a value in response to a potential of the output terminal 230d. The voltage follower 230 operates so that the potential of the output terminal 230d nears that of the non-inverting input terminal 230a. It is thereby possible to make the nodes N2 and N4 equal in potential. It is noted that the output terminals 230c and 230d may be integrated into one output terminal.

The voltage follower 230 has an error amplifier 231 and the PMOS transistor PM4. The error amplifier 231 has a non-inverting input terminal 231a, an inverting input terminal 231b, and an output terminal 231c. The non-inverting input terminal 231a constitutes the non-inverting input terminal 230a of the voltage follower 230. The inverting input terminal 231b constitutes the inverting input terminal 230b of the voltage follower 230. The output terminal 231c is connected to a gate of the PMOS transistor PM4. A source of the PMOS transistor PM4 constitutes the output terminal 230d of the voltage follower 230. A drain of the PMOS transistor PM4 constitutes the output terminal 230c of the voltage follower 230.

Figure 2:
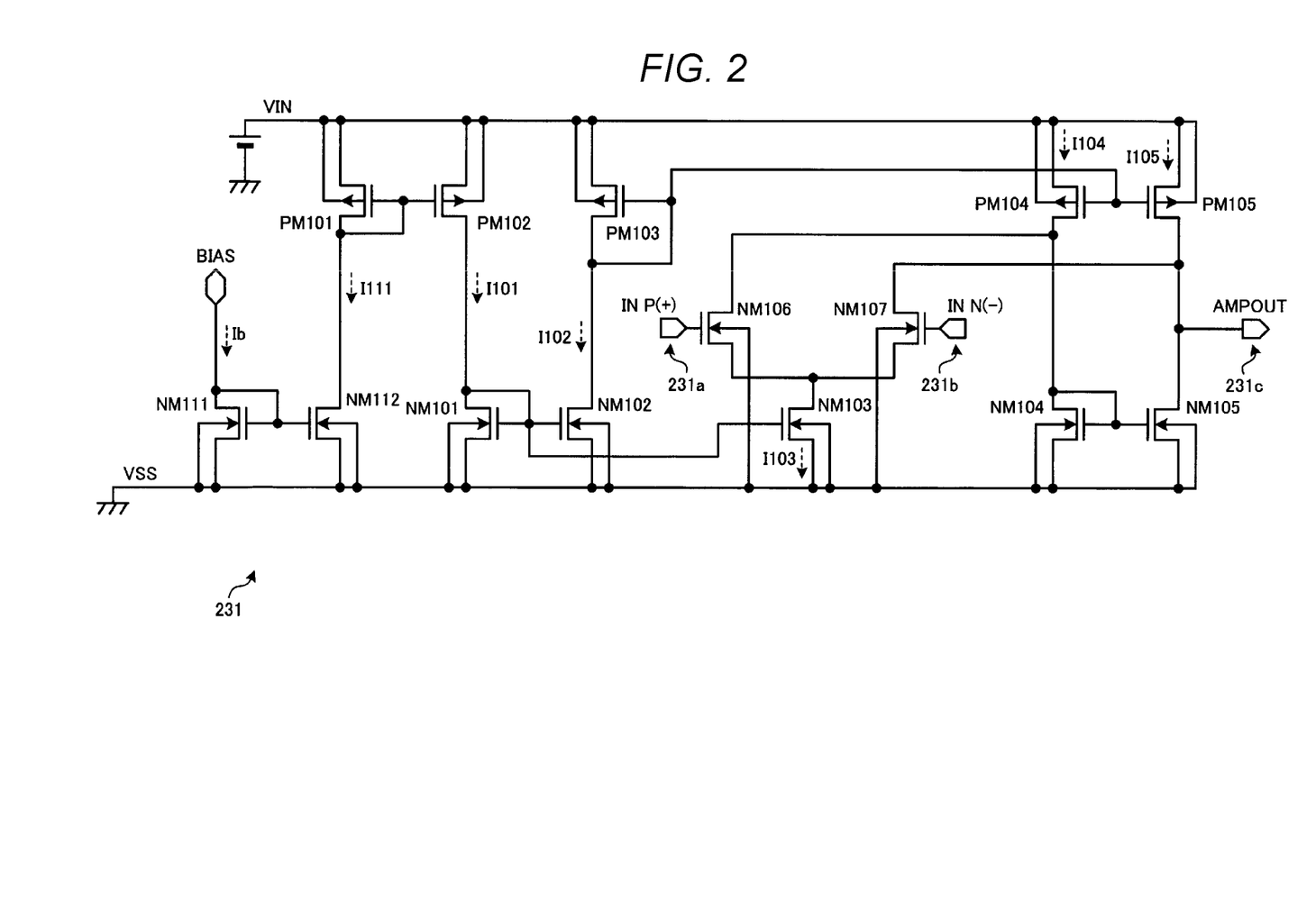
FIG. 2 is a circuit diagram showing a configuration of an error amplifier according to at least one embodiment.

The error amplifier 231 has a configuration, for example, shown in FIG. 2. FIG. 2 is a circuit diagram showing the configuration of the error amplifier 231. The error amplifier 231 has PMOS transistors PM101 to PM105 and NMOS transistors NM101 to NM107, NM111, and NM112.

The NMOS transistors NM111 and NM112 constitute a current mirror circuit, and a bias current Ib flowing via a bias terminal BIAS is copied to the NMOS transistor NM112 side at a predetermined mirror ratio as a bias current I111. The PMOS transistors PM101 and PM102 constitute a current mirror circuit, and the bias current I111 is copied to the PMOS transistor PM102 side at a predetermined mirror ratio as a bias current I101. The NMOS transistors NM101 and NM103 constitute a current mirror circuit, and the bias current I101 is copied to the NMOS transistor NM103 side at a predetermined mirror ratio as a bias current I103. The NMOS transistors NM101 and NM102 constitute a current mirror circuit, and the bias current I101 is copied to the NMOS transistor NM102 side at a predetermined mirror ratio as a bias current I102. The PMOS transistors PM103 and PM105 constitute a current mirror circuit, and the bias current I102 is copied to the PMOS transistors PM104 and PM105 side at a predetermined mirror ratio as bias currents I104 and I105, respectively.

The non-inverting input terminal 231a is connected to a gate of the NMOS transistor NM106. A drain of the NMOS transistor NM106 is connected to a drain of the PMOS transistor PM104.

The inverting input terminal 231b is connected to a gate of the NMOS transistor NM107. A drain of the NMOS transistor NM107 is connected to a drain of the PMOS transistor PM105.

Sources of the NMOS transistor NM106 and NM107 are commonly connected to a drain of the NMOS transistor NM103. The drain of the NMOS transistor NM103 is connected to the sources of the NMOS transistors NM106 and NM107 and a source thereof is connected to a ground potential VSS.

The output terminal 231c is connected to a node between a drain of the PMOS transistor PM105 and a drain of the NMOS transistor NM105.

The non-inverting input terminal 231a shown in FIG. 2 corresponds to the non-inverting input terminal 231a shown in FIG. 1 and receives an electric signal corresponding to a potential of the node N2 via the node N8. The inverting input terminal 231b shown in FIG. 2 corresponds to the inverting input terminal 231b shown in FIG. 1 and receives an electric signal corresponding to a potential of the node N4.

The NMOS transistor NM106 shown in FIG. 2 is turned on in response to the electric signal corresponding to the potential of the node N2, and the NMOS transistor NM107 is turned on in response to the electric signal corresponding to the potential of the node N4. If the bias currents are regulated as represented by, for example, I104≈I105, then a difference in drain current is generated between the PMOS transistor PM104 and the NMOS transistor NM104 in response to a difference between the electric signal corresponding to the potential of the node N2 and that corresponding to the potential of the node N4. A current in response to the difference flows through the output terminal 231c, whereby a potential of the output terminal 231c either rises or falls. The difference between the electric signal received by the non-inverting input terminal 231a and that received by the inverting input terminal 231b is thereby amplified and appears on the output terminal 231c.

Figure 3:
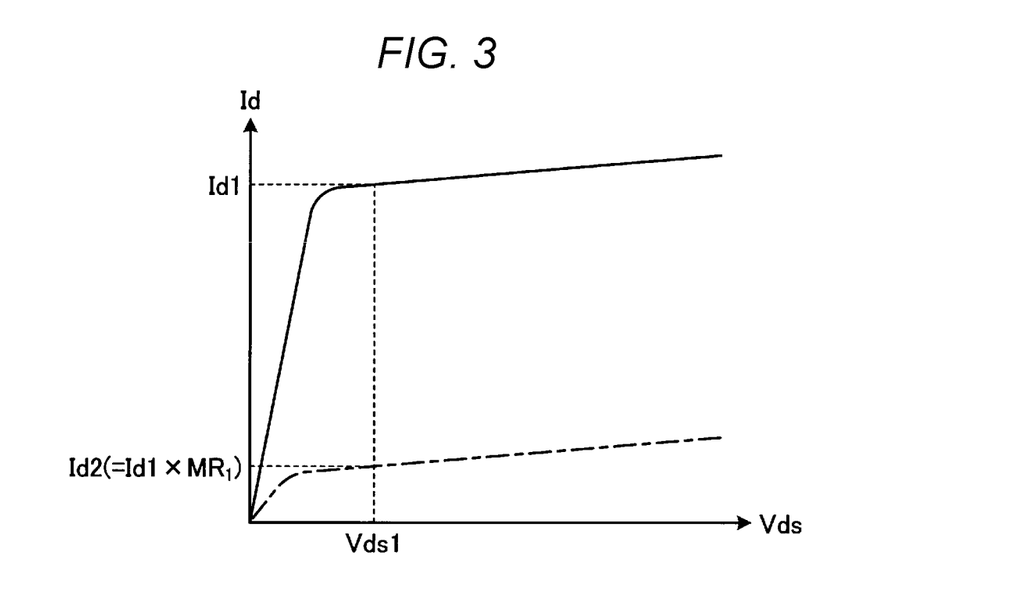
FIG. 3 shows voltage-current characteristics of an output transistor and a replica transistor according to at least one embodiment.

Referring back to FIG. 1, the error amplifier 231 controls a gate potential of the PMOS transistor PM4 so that the inverting input terminal 231b and the non-inverting input terminal 231a are made equal in potential (virtual ground potential), that is, the nodes N2 and N4 are made equal in potential. As shown in FIG. 3, operating points of the output transistor 12 and the replica transistor 21 are thereby controlled. FIG. 3 shows voltage-current characteristics of the output transistor 12 and the replica transistor 21. In FIG. 3, the voltage-current characteristics of the output transistor 12 are indicated by a solid line and the voltage-current characteristics of the replica transistor 21 are indicated by a dashed line.

In other words, causing the drain potential of the replica transistor 21 to be near that of the output transistor 12 makes it possible to set the Vds of the output transistor 12 and that of the replica transistor 21 equally to a value Vds1. As a result, as shown in FIG. 3, it is possible to set the mirror ratio MR of the current I1=Id1 of the output transistor 12 to the replica current I2=Id2 to $MR_1$, that is, MR=$MR_1$ matching the ratio of the dimension of the PMOS transistor PM1 to that of the PMOS transistor PM2.

Figure 4:
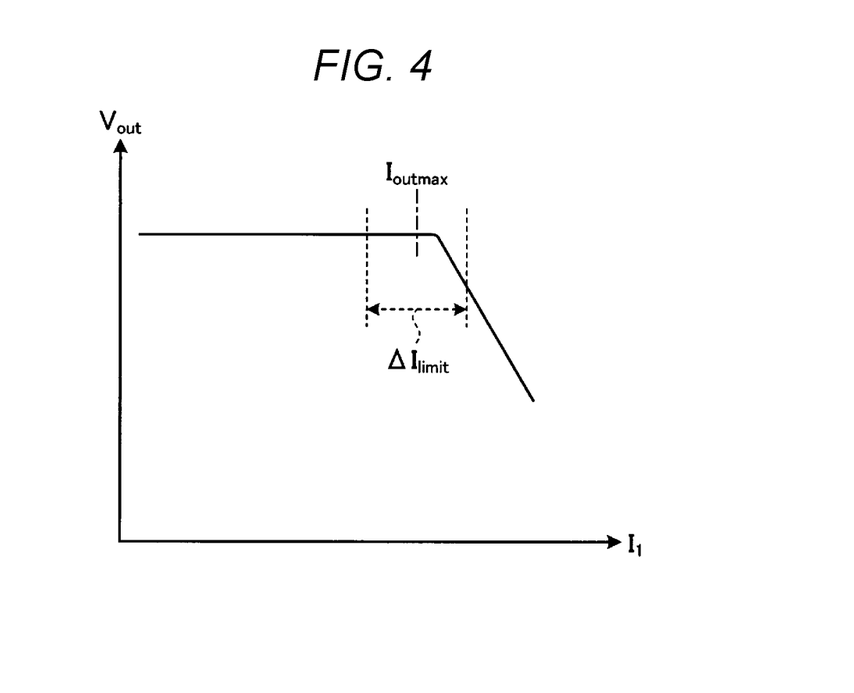
FIG. 4 shows an operation performed by the semiconductor integrated circuit according to at least one embodiment.

In other words, the mirror ratio MR may be set generally equal to the design value of Expression (3); thus, as shown in FIG. 4, the current-limiting circuit 22 may perform the current-limiting operation in an appropriate current range $\Delta I_{limit}$ close to a current Ioutmax that is an upper limit of a constant-voltage operation by the regulator circuit 10. It is thereby possible to easily realize the appropriate current-limiting operation. It is noted that FIG. 4 shows an operation performed by the semiconductor integrated circuit 1.

As described so far, according to at least one embodiment, the drain potential of the output transistor 12 is made equal to the drain potential of the replica transistor in the semiconductor integrated circuit 1. This facilitates realizing the appropriate current-limiting operation performed by the current-limiting circuit 22. This can, therefore, facilitate designing the semiconductor integrated circuit 1 and setting an effective limited-current value.

Figure 5:
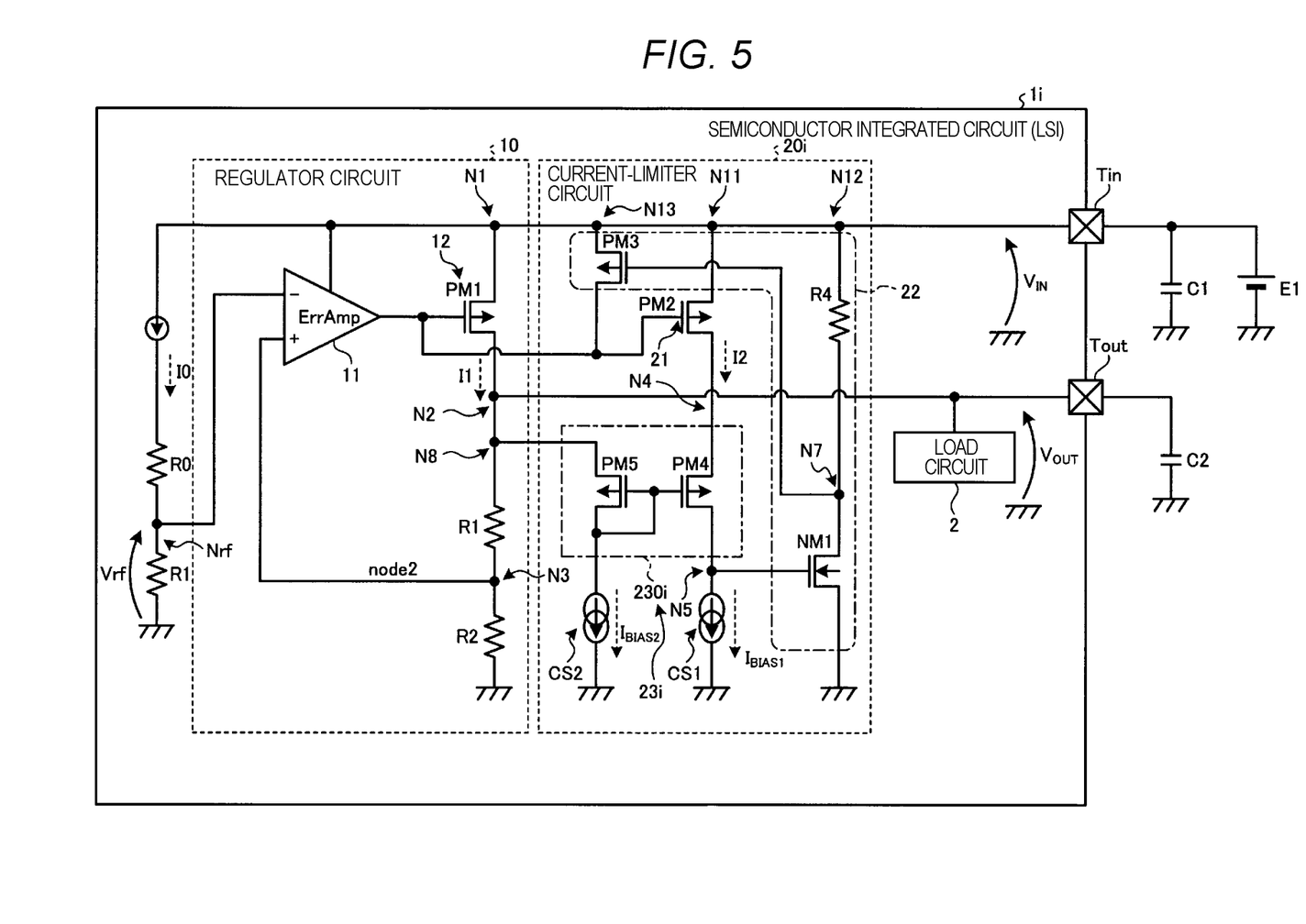
FIG. 5 is a circuit diagram showing a configuration of a semiconductor integrated circuit according to a modification of at least one embodiment.

Making the drain potential of the output transistor 12 equal to the drain potential of the replica transistor 21 may be implemented by a current mirror circuit as an alternative to the voltage follower 230. Specifically, a semiconductor integrated circuit 1i may be configured as shown in FIG. 5. FIG. 5 is a circuit diagram showing a configuration of the semiconductor integrated circuit 1i according to a modification of at least one embodiment.

The semiconductor integrated circuit 1i has a current-limiter circuit 20i as an alternative to the current-limiter circuit 20 (see FIG. 1). The current-limiter circuit 20i has a potential regulation circuit 23i as an alternative to the potential regulation circuit 23 (see FIG. 1), and the current-limiter circuit 20i has further a current source CS2. The potential regulation circuit 23i may have a current mirror circuit 230i shown in FIG. 5 as an alternative to the voltage follower 230 (see FIG. 1).

The current mirror circuit 230i has PMOS transistors PM5 and PM4. The PMOS transistor PM5 has a source that is connected to the node N2 via the node N8 and a drain and a gate that are connected to the current source CS2 and the gate of the PMOS transistor PM4. The PMOS transistor PM4 has the source that is connected to the node N4 and the drain that is connected to the current source CS1 via the node N5. The current source CS1 is configured to cause the bias current $I_{BIAS1}$ to flow. The current source CS2 is configured to cause a bias current $I_{BIAS2}$ to flow.

At this time, the bias current $I_{BIAS1}$ of the current source CS1 and the bias current $I_{BIAS2}$ of the current source CS2 satisfy the following Expression (4).

$$I_{BIAS1} > I_{BIAS2} \quad (4)$$

Furthermore, if it is assumed that a dimension of the PMOS transistor PM4 is $D_6$ and that of the PMOS transistor PM5 is $D_5$, the current mirror circuit 230i is designed to satisfy the following Expression (5).

$$D_6 > D_5 \quad (5)$$

In a normal operation (a no current-limiting state), that is, in a state in which the current I2 of the replica transistor 21 satisfies I2≤$I_{BIAS1}$, a difference remains between a gate-source voltage Vgs of the PMOS transistor PM5 and a gate-source voltage Vgs of the PMOS transistor PM4. However, since the potential of the node N4 is generally VOUT, it is possible to make generally zero the Vds difference between the output transistor 12 (PMOS transistor PM1) and the replica transistor 21 (PMOS transistor PM2). It is thereby possible to set the ratio I2/I1 of the current I1=Id1 (see FIG. 3) of the output transistor 12 to the replica current I2=Id2 (see FIG. 3) to the mirror ratio MR=$MR_1$ matching the ratio of the dimension of the PMOS transistor PM1 to that of the PMOS transistor PM2.

If compared with the voltage follower 230 (see FIG. 1) including the error amplifier 231 shown in FIG. 2, the current mirror circuit 230i shown in FIG. 5 is achieved with fewer transistors. It is thereby possible to make small a circuit size of the semiconductor integrated circuit 1i and reduces current consumption of the semiconductor integrated circuit 1i.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A semiconductor integrated circuit comprising:
   an output transistor electrically connected between the power supply side first node and the output-side second node
   an error amplifier having a first input terminal that is electrically connected to a third node between the second node and a standard potential, a second input terminal that is electrically connected to a reference voltage, and an output terminal that is electrically connected to a gate of the output transistor;
   a replica transistor electrically connected between the first node and a fourth node that is different from the second node and constitutes a circuit that is configured to operate to correspond to the output transistor;
   a current-limiting circuit having
      an input node that is electrically connected to a fifth node between the fourth node and a first current source, wherein the fifth node is directly connected to the first current source, and
      an output node that is electrically connected to a gate of the output transistor and a gate of the replica transistor; and
   a potential regulation circuit electrically connected to the second node and the fourth node.
2. The semiconductor integrated circuit according to claim 1, wherein the potential regulation circuit is configured to make a potential of the second node equal to a potential of the fourth node.

3. The semiconductor integrated circuit according to claim 2, wherein
the potential regulation circuit includes
a voltage follower having a first input terminal that is electrically connected to the second node, a first output terminal that is electrically connected to a second input terminal and the fourth node, and a second output terminal that is electrically connected to the fifth node.

4. The semiconductor integrated circuit according to claim 3, wherein
the voltage follower includes:
a second error amplifier having a first input terminal that is electrically connected to the second node and a second input terminal that is electrically connected to the fourth node; and
a PMOS transistor having a gate that is connected to an output terminal of the second error amplifier, a source that is electrically connected to the fourth node, and a drain that is electrically connected to the first current source.

5. The semiconductor integrated circuit according to claim 4, wherein the second error amplifier is configured to control a potential of the second node and the fourth node to be equal.

6. The semiconductor integrated circuit according to claim 2, wherein
the potential regulation circuit includes
a current mirror circuit having a sense side that is electrically connected between the second node and a second current source and a mirror side that is electrically connected between the fourth node and the first current source.

7. The semiconductor integrated circuit according to claim 1, wherein the output transistor and the replica transistor are PMOS transistors.

8. The semiconductor integrated circuit according to claim 1, wherein a current of the output transistor is less than a current of the replica transistor.

9. A semiconductor integrated circuit comprising:
an output transistor electrically connected between a first node and a second node;
a replica transistor electrically connected between the first node and a third node that is different from the second node and constitutes a circuit that is configured to operate to correspond to the output transistor
a current-limiting circuit having an input node that is electrically connected to a fourth node between the third node and a first current source, wherein the fourth node is directly connected to the first current source, and a n output node that is electrically connected to a gate of the output transistor and a gate of the re plica transistor; and
a potential regulation circuit electrically connected to the second node and the third node.

10. The semiconductor integrated circuit according to claim 9, wherein
the potential regulation circuit is configured to make a potential of the second node equal to a potential of the third node.

11. The semiconductor integrated circuit according to claim 10, wherein
the potential regulation circuit includes
a voltage follower having a first input terminal that is electrically connected to the second node, a first output terminal that is electrically connected to a second input terminal and the third node, and a second output terminal that is electrically connected to the fourth node.

12. The semiconductor integrated circuit according to claim 11, wherein
the voltage follower includes:
an error amplifier having a first input terminal that is electrically connected to the second node and a second input terminal that is electrically connected to the third node; and
a PMOS transistor having a gate that is connected to an output terminal of the error amplifier, a source that is electrically connected to the third node, and a drain that is electrically connected to the first current source.

13. The semiconductor integrated circuit according to claim 12, wherein the second error amplifier is configured to control a potential of the second node and the fourth node to be equal.

14. The semiconductor integrated circuit according to claim 10, wherein
the potential regulation circuit includes
a current mirror circuit having a sense side that is electrically connected between the second node and a second current source and a mirror side that is electrically connected between the third node and the first current source.

15. The semiconductor integrated circuit according to claim 9, wherein the output transistor and the replica transistor are PMOS transistors.

16. The semiconductor integrated circuit according to claim 9, wherein a current of the output transistor is less than a current of the replica transistor.

17. The semiconductor integrated circuit according to claim 1, further comprising:
a PMOS transistor having a source that is electrically connected to the fourth node, and a drain that is electrically connected to the first current source.

* * * * *